United States Patent
Lepp et al.

(10) Patent No.: US 10,757,613 B2
(45) Date of Patent: *Aug. 25, 2020

(54) COMMUNICATING IN A NARROWBAND CHANNEL

(71) Applicant: BlackBerry Limited, Waterloo (CA)

(72) Inventors: James Randolph Winter Lepp, Ottawa (CA); Stephen McCann, Southampton (GB); Michael Peter Montemurro, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,124

(22) Filed: Dec. 3, 2018

(65) Prior Publication Data

US 2019/0110227 A1   Apr. 11, 2019

Related U.S. Application Data

(63) Continuation of application No. 15/154,306, filed on May 13, 2016, now Pat. No. 10,149,209.

(51) Int. Cl.
| | |
|---|---|
| *H04W 36/00* | (2009.01) |
| *H04W 72/12* | (2009.01) |
| *H04W 52/02* | (2009.01) |
| *H04W 52/36* | (2009.01) |
| *H04W 84/12* | (2009.01) |

(52) U.S. Cl.
CPC ... *H04W 36/0022* (2013.01); *H04W 52/0212* (2013.01); *H04W 52/367* (2013.01); *H04W 72/12* (2013.01); *H04W 72/1252* (2013.01); *H04W 84/12* (2013.01)

(58) Field of Classification Search
CPC .......... H04W 36/0022; H04W 52/367; H04W 72/12; H04W 72/1252; H04W 84/12; H04L 5/0037; H04L 5/0094
See application file for complete search history.

(56) References Cited

U.S. PATENT DOCUMENTS

| | | | |
|---|---|---|---|
| 2004/0242230 A1* | 12/2004 | Rue | H04W 92/02 455/433 |
| 2007/0165586 A1* | 7/2007 | Taylor | H04W 74/0808 370/338 |
| 2013/0039298 A1 | 2/2013 | Park | |
| 2013/0315141 A1* | 11/2013 | Homchaudhuri | H04W 88/06 370/328 |

(Continued)

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.

(Continued)

*Primary Examiner* — Kan Yuen
(74) *Attorney, Agent, or Firm* — Trop, Pruner & Hu, P.C.

(57) ABSTRACT

In some examples, a wireless device transmits a narrowband downlink frame in a narrowband channel, the narrowband downlink frame comprising a beacon frame that is transmitted periodically.

17 Claims, 6 Drawing Sheets

(56) References Cited

U.S. PATENT DOCUMENTS

| | | | | |
|---|---|---|---|---|
| 2014/0301260 | A1* | 10/2014 | Park | H04W 74/06 |
| | | | | 370/311 |
| 2015/0078298 | A1 | 3/2015 | Barriac | |
| 2015/0271748 | A1 | 9/2015 | Seok | |
| 2016/0087744 | A1* | 3/2016 | El Ayach | H04J 11/0086 |
| | | | | 370/328 |
| 2017/0019853 | A1* | 1/2017 | Ghosh | H04W 52/0216 |
| 2019/0052445 | A1* | 2/2019 | Rantala | H04W 72/12 |

OTHER PUBLICATIONS

IEEE 802.11.11-15/1181r0, IEEE P802.11 Wireless LANs, Long Range Low Power (LRLP) Operation in 802.11: Use Cases and Functional Requirements: Guidelines for PAR Development, Mar. 2016 (10 pages).

IEEE 802.11-16/0024r0, IEEE P802.11 Wireless LANs, Proposed TGax draft specification, Jan. 2016 (147 pages).

Table of Contents and Selected Pages from IEEE 802.11-REVmc/D5.0, IEEE P802.11-REVmcTM/D5.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Jan. 2016 (134 pages).

Canadian Intellectual Property Office, International Search Report and Written Opinion for PCT/CA2017/050561 dated Aug. 23, 2017 (9 pages).

Ghosh et al., IEEE 802.11-15/1108r0, Technical Feasibility for LRLP, Sep. 14, 2015 (10 pages).

European Patent Office, Extended European Search Report for Appl. No. 17795218.1 dated Nov. 4, 2019 (7 pages).

* cited by examiner

COMMUNICATING IN A NARROWBAND CHANNEL

CROSS REFERENCE TO RELATED APPLICATION

This is a continuation of U.S. application Ser. No. 15/154,306, filed May 13, 2016, U.S. Pat. No. 10,149,209, which is hereby incorporated by reference in its entirety.

BACKGROUND

Devices such as computers, handheld devices, or other types of devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

BRIEF DESCRIPTION OF THE DRAWINGS

Some implementations of the present disclosure are described with respect to the following figures.

DETAILED DESCRIPTION

Figure 1:
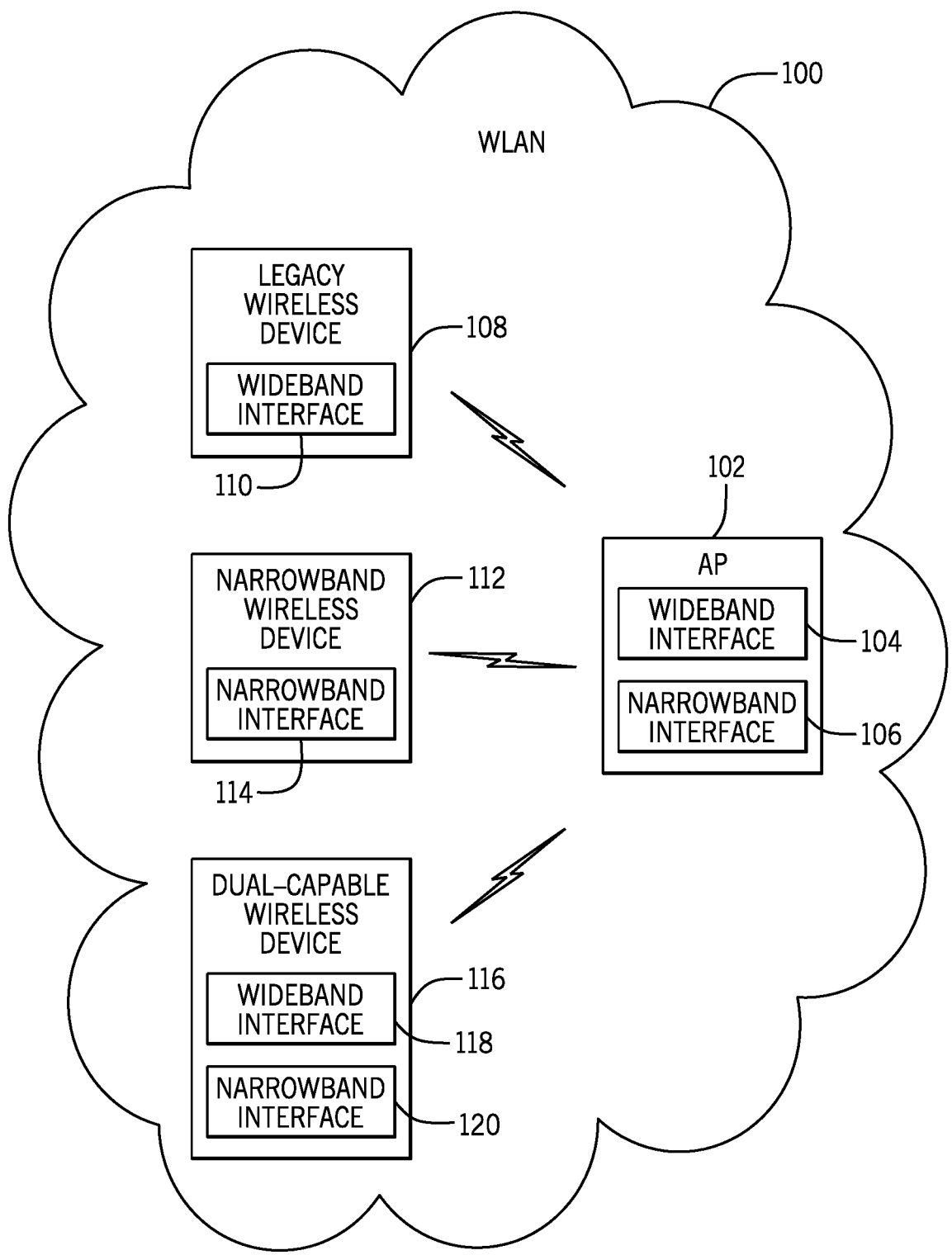
FIG. 1 is a block diagram of an example network arrangement according to some implementations.

In a wireless local area network (WLAN), a wireless device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 Specifications. In other examples, WLANs can operate according to other protocols. More generally, techniques or mechanisms according to some implementations of the present disclosure can be used with other types of wireless networks, such as cellular networks or other wireless networks. In a cellular network, an AP can refer to a wireless access network node, such as a base station or enhanced node B (eNodeB) in a cellular network that operates according to the Long-Term Evolution (LTE) standards as provided by the Third Generation Partnership Project (3GPP). The LTE standards are also referred to as the Evolved Universal Terrestrial Radio Access (E-UTRA) standards.

Examples of wireless devices include computers (e.g. tablet computers, notebook computers, desktop computers, etc.), handheld devices (e.g. smart phones, personal digital assistants, etc.), wearable devices (smart watches, electronic eyeglasses, etc.), game appliances, health monitors, vehicles (or equipment in vehicles), or other types of endpoint or user devices that are able to communicate wirelessly.

In some examples, the channel widths of a frequency channel used in communications over a WLAN that operates according to the IEEE 802.11 Specifications can be 20 megahertz (MHz) or 40 MHz. A WLAN can employ 20 MHz (or 40 MHz) channels in the 2.4 gigahertz (GHz) frequency band, in some examples. Although reference is made to specific example channel widths and frequency bands, it is noted that in other examples, techniques or mechanisms according to some implementations can be used with other channel widths and frequency bands.

In the present disclosure, a WLAN that operates using 20 MHz or 40 MHz channels (or frequency channels of other widths) can be referred to as a wideband WLAN. Channels used by a wideband WLAN can be referred to as wideband channels.

The Long Range Low Power (LRLP) technology for WLAN communications has been proposed for IEEE 802.11. LRLP uses frequency channel widths that are less than the channel width of a wideband WLAN. For example, LRLP can employ channel widths of approximately 2 MHz. A frequency channel that has a channel width less than that of the frequency channel used in a wideband WLAN can be referred to as a narrowband channel. In other examples, a narrowband channel can have a channel width of approximately 1 MHz, 5 MHz, 10 MHz, or any other width that is less than the channel width of a wideband channel.

More generally, a narrowband WLAN can refer to WLAN in which communications between stations (STAs) or between a STA and an AP can employ a frequency channel having a channel width (or frequency range) less than the channel width (or frequency range) of a channel used by a wideband WLAN. According to IEEE 802.11, a STA is a device that has the capability to use the 802.11 protocol. A STA can be an AP, or alternatively, a STA can be a non-AP STA, such as any of the wireless devices discussed above.

In some examples, a narrowband WLAN uses a narrowband channel that is physically located within the wideband channel of a wideband WLAN. In other words, the narrowband channel of the narrowband WLAN is a subset of a wideband channel of a wideband WLAN. The narrowband channel can also be considered to be a sub-channel of the wideband channel. In some examples, the narrowband channel can be centered around the same center frequency as the wideband channel. In other examples, the narrowband channel does not have to be centered around the same center frequency as the wideband channel. In yet further examples, the narrowband channel may be an orthogonal frequency-division multiple access (OFDMA) allocation block.

Although reference is made to wideband WLANs and narrowband WLANs, it is noted that techniques or mechanisms according to some implementations can also be used with other types of wireless networks that can include wideband wireless networks and narrowband wireless networks, with a wideband wireless network using a wideband channel and a narrowband wireless network using a narrowband channel that is a subset of the wideband channel.

FIG. 1 shows an example WLAN 100 that includes an AP 102. Although just one AP is depicted in FIG. 1, it is noted that the WLAN 100 can include multiple APs. If the wireless network 100 is a cellular access network, then the AP 102 can be considered a wireless access network node, such as an eNodeB.

The AP 102 is able to serve both wireless devices communicating in wideband channels and wireless devices operating in narrowband channels. The AP 102 includes a wideband interface 104 to communicate with wireless devices over wideband channels, and a narrowband interface 106 to communicate with wireless devices over narrowband channels. The wideband interface 104 can include a physical layer (PHY) and a Medium Access Control (MAC) layer (which is a layer 2 above the physical layer). The MAC/PHY layers of the wideband interface 104 are configured to communicate over the wideband channels. Similarly, the narrowband interface 106 includes a PHY and a MAC layer, which are configured to operate in narrowband channels.

Several types of wireless devices are depicted in FIG. 1. A legacy wireless device 108 includes a wideband interface 110 to communicate over wideband channels. The legacy wireless device 108 is a wireless device that is able to operate in just the wideband channels, and not in the narrowband channels. The legacy wireless device 108 may also be capable of operating in other channels (e.g. using other non-WLAN interfaces).

A narrowband wireless device 112 includes a narrowband interface 114 to communicate with the AP 102 over narrowband channels. A narrowband wireless device 112 is not able to communicate over wideband channels. The narrowband wireless device 112 may also be capable of operating in other channels (e.g. using other non-WLAN interfaces).

A dual-capable wireless device 116 includes both a wideband interface 118 and a narrowband interface 120. The dual-capable wireless device 116 is able to communicate over either wideband channels or narrowband channels. The dual-capable wireless device 116 may also be capable of operating in other channels (e.g. using other non-WLAN interfaces).

The narrowband wireless device 112 and the dual-capable wireless device 116 can be referred to as narrowband-capable wireless devices, since they are capable of narrowband operation in which communications occur in narrowband channels.

Two issues can be associated with use of both wideband and narrowband channels in the WLAN 100 or other type of wireless network.

Issue 1 relates to enabling coexistence among wireless devices of the three different types depicted in FIG. 1, including the legacy wireless device 108, the narrowband wireless device 112, and the dual-capable wireless device 116. It would be desirable to enable such coexistence without having to monitor, by the AP 102, both the wideband and narrowband channels. Issue 1 also relates to ensuring that a dual-capable wireless device, such as the wireless device 116, can operate in just one of the wideband mode (a mode in which the wireless device communicates in a wideband channel) or narrowband mode (a mode in which the wireless device communicates in a narrowband channel) at any given time.

Issue 2 relates to enhancing operation by providing additional information to a wireless device operating in a first channel (e.g., a wideband channel) information about operation in a second channel (e.g., a narrowband channel), and vice-versa. It is undesirable to have a dual-capable wireless device frequently switching between wideband mode and narrowband mode, as doing so is costly in terms of radio resources and can increase power consumption at the dual-capable wireless device.

1. Coexistence of Narrowband Operation by Ceasing Wideband Operation

The solutions of this section (Section 1) can be used to address Issue 1 discussed above.

Figure 2:
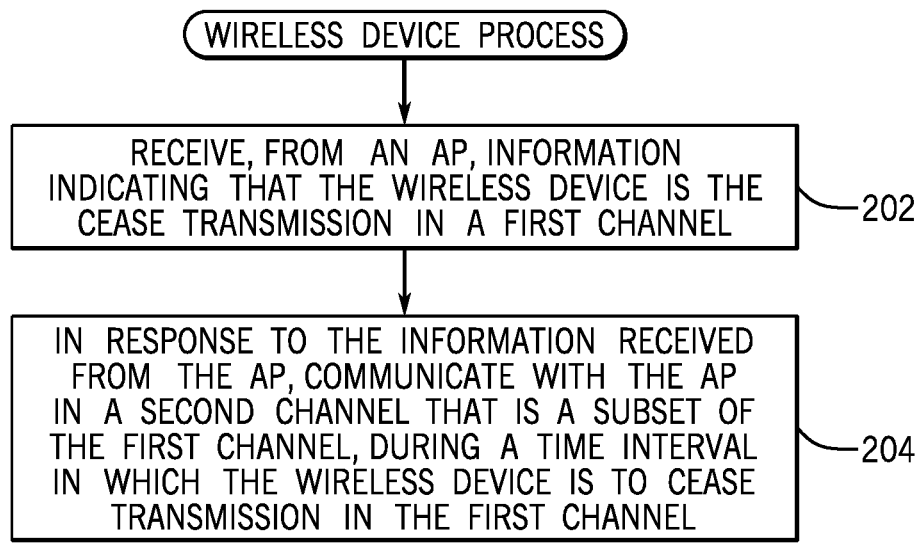
FIG. 2 is a flow diagram of an example process performed by a wireless device according to some implementations.

FIG. 2 is a flow diagram of an example process performed by a wireless device, such as the narrowband wireless device 112 or the dual-capable wireless device 116, according to some examples. The wireless device receives (at 202) from the AP 102, information indicating that the wireless device is to cease transmission in a first channel (e.g., the wideband channel). In response to the information received from the AP 102, the wireless device communicates (at 204) with the AP in a second channel (e.g., a narrowband channel) that is a subset of the first channel, during a time interval in which the wireless device is to cease transmission in the first channel.

In some examples, the information received (at 202) by the wireless device from the AP 102 includes a Quiet Element. The Quiet Element can be a legacy Quiet Element as defined by the IEEE 802.11 Specifications. Traditionally, the legacy Quiet Element is used to support Dynamic Frequency Selection (DFS) channels of the 5 GHz frequency band. In the DFS channels, an AP is to cease operation if the AP detects a radar operating in the DFS channel. A legacy Quiet Element can also be used to silence STAs within a basic service set (BSS) to allow an AP to make radio frequency (RF) measurements, such as in the 2.4 and 5 GHZ frequency bands. A BSS refers to a network that includes a single AP and one or more client STAs (non-AP STAs) associated with the AP.

The legacy Quiet Element defines a time interval during which no transmission occurs in a current channel. Other information can also be included in the legacy Quiet Element, as provided by the IEEE 802.11 Specifications.

In accordance with some implementations of the present disclosure, the legacy Quiet Element can be used to suspend transmission in a wideband channel to allow for transmission in a narrowband channel that is a subset of the wideband channel. During a quiet interval calculated using the information in the legacy Quiet Element, both the AP 102 and wireless devices that are part of the BSS of the AP 102 refrain from transmission in a wideband channel. During a quiet interval, the AP 102 can transmit and receive from a wireless device (such as the narrowband wireless device 112 or the dual-capable wireless device 116) in a narrowband channel using the narrowband interface 106 of the AP 102. Alternatively or additionally, during the quiet interval, the AP 102 and the wireless device can perform other operations, referred to as "different mode operation" in the discussion accompanying FIG. 3.

As a legacy Quiet Element has no extra information beyond what is already defined by the IEEE 802.11 Specifications, a wireless device that is capable of operation in both narrowband and wideband channels, such as the dual-capable wireless device 116, may implicitly use the legacy Quiet Element as an indication to go into a narrowband listening mode during the quiet interval. Additionally, the dual-capable wireless device 116 can use the reception of the legacy Quiet Element as a trigger to start the process of discovering the narrowband network and subsequently transition the wireless device's mode of operation to narrowband communication. Switching to narrowband operation can save power at the wireless device as well as extend the range of communications of the wireless device, since communications using a narrowband channel can have a greater distance range.

During the quiet interval, the wireless device 116 can communicate using a narrowband channel directly with other narrowband-capable STAs that are able to communicate in the narrowband channel, including other dual-capable STAs and narrowband-only STAs. Moreover, during the quiet interval, the wireless device 116 can have a high chance of being able to communicate with narrowband-capable STAs at a longer range than the range of the wideband network.

Figure 3:
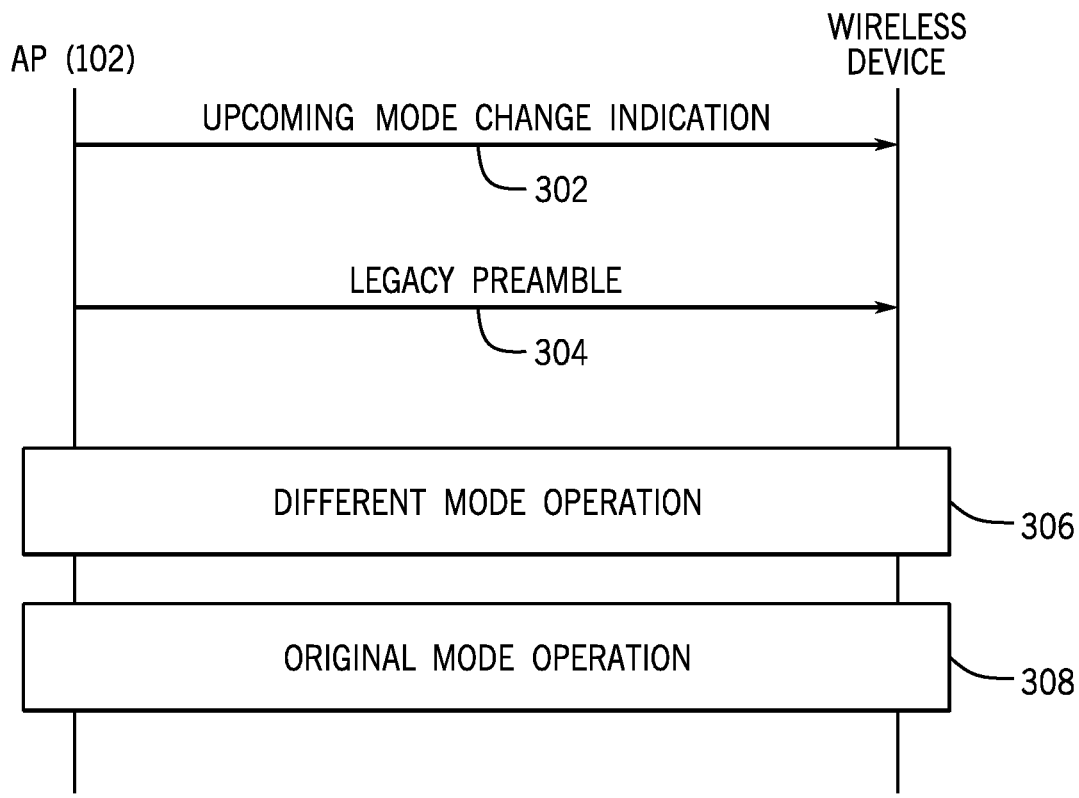
FIG. 3 is a message flow diagram of example interactions between an access point (AP) and a wireless device according to further implementations.

FIG. 3 is a message flow diagram that illustrates interaction between the AP 102 and a wireless device, according to some examples. As depicted in FIG. 3, the AP 102 transmits (at 302) an indication of an upcoming mode change (to change between communications in a first channel, e.g., wideband channel, and communications in the second channel, e.g., narrowband channel). More generally, the upcoming mode change indication provides an indication to the wireless device that the wireless device can change its mode of operation or otherwise can start a different mode of operation (such as communicating in a narrowband channel) that the wireless device was unable to perform beforehand. In the context of a WLAN, the upcoming mode change indication provides an indication that a BSS is able to support a different mode of communication.

The upcoming mode change indication can be in the form of a legacy Quiet Element that is carried in a beacon or a Probe Response frame transmitted by the AP 102. A beacon can refer to a signal or other information that is periodically transmitted by the AP 102 at periodic time intervals. A Probe Response frame refers to a response to a Probe Request frame sent by a wireless device to discover or request further information about a wireless network. In other examples, the legacy Quiet Element can be transmitted in another message or information element.

The wireless device receives and decodes the beacon or Probe Response frame (or other message or information element) that includes the upcoming mode change indication. The wireless device can calculate the start time and duration of the upcoming operation of the BSS in the different mode by calculating the quiet interval from the Quiet Count, Quiet Period, Quiet Duration and/or the Quiet Offset fields in the legacy Quiet Element.

In some examples, immediately prior to operating in the different mode, the AP 102 can transmit (at 304) a legacy preamble to silence overlapping BSS (OBSS) STAs. OBSS refers to the concept where multiple independent networks (including respective APs) within radio range of each other may overlap in the same channel. OBSS STAs may attempt to access the same channel, which can lead to interference. The legacy preamble can include information that is useable by the OBSS STAs to remain quiet for a specified duration based on the information of the legacy preamble.

In alternative implementations, the transmission (at 304) of the legacy preamble can be omitted. In such implementations, instead of using a legacy preamble, a wireless device can use energy detection to detect if a medium is busy (e.g. by checking if detected energy on the medium is above a threshold).

The wireless device and the AP 102 then proceeds to perform (at 306) the different mode operation, which can include communications in a narrowband channel during the quiet interval. During the time period the wireless device calculated as the quiet interval, the wireless device does not transmit any information in a wideband channel. In addition, during the quiet interval, the wireless device can perform any one or more of the following: (1) opportunistically reduce its power, such as by turning off a transmitter and receiver and related hardware, such as the transmitter and receiver and related hardware for the wideband channel, (2) switch operating modes (such as switching from communication over a wideband channel to communication over a narrowband channel), and (3) perform neighbor AP searching, which can include active and passive scanning of other non-overlapping channels. Active scanning can refer to a wireless device sending a Probe Request to locate an AP. Passive scanning can refer to a wireless device listening to advertisements from an AP, without the wireless device sending any Probe Requests.

During the quiet interval, the AP 102 operates in the narrowband channel to transmit and receive from wireless devices that are performing narrowband communications.

Following the quiet interval during which the different mode operation (306) occurs, the wireless device and the AP 102 can switch back to an original mode of operation (at 308), which is the mode of operation of the AP 102 and the wireless device prior to the switch to the different mode operation. In the original mode operation (308), the AP 102 and the wireless device can communicate over a wideband channel.

Figure 4:
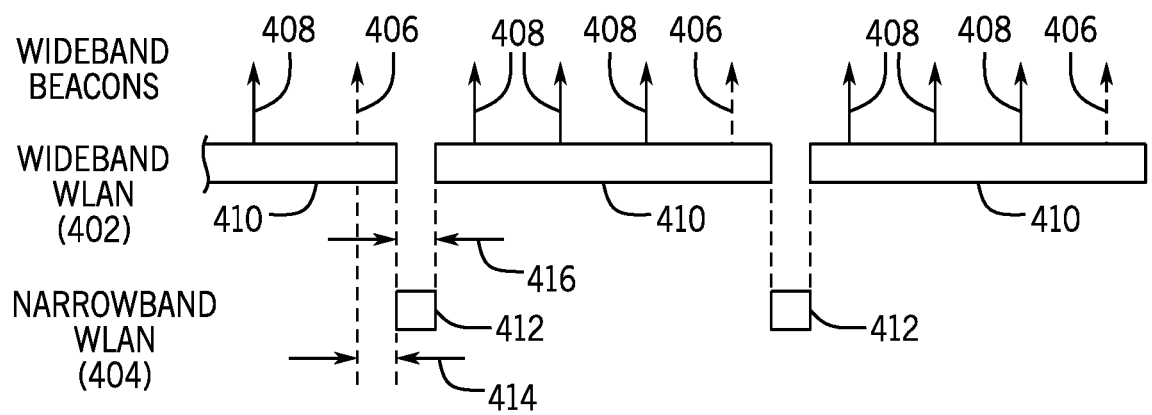
FIG. 4 illustrates transmissions by an AP according to some implementations.

FIG. 4 is a timing diagram showing communications in a wideband WLAN 402 and in a narrowband WLAN 404. The example shows beacons that can be transmitted by the AP 102 in a wideband channel. Such beacons are referred to as wideband beacons. FIG. 4 shows two types of wideband beacons, including wideband beacons 406 that each contains a Quiet Element, and wideband beacons 408 that do not include a Quiet Element. In some examples, the wideband beacons 406 containing Quiet Elements can be sent once every specified number (N≥1) of wideband beacons. For example, the wideband beacons 406 containing Quiet Elements can be sent once every four wideband beacons. The remaining wideband beacons are the wideband beacons 408 without Quiet Elements.

In other examples, a Quiet Element can be included in each wideband beacon transmitted by the AP 102.

FIG. 4 also shows time intervals 410 of wideband operation (in which communications between the AP 102 and the wireless device occurs over wideband channels) and time intervals 412 of narrowband operation (in which communications between the AP 102 and the wireless device occurs over narrowband channels). A time interval 412 of narrowband operation can include the entirety or a subset of the quiet interval discussed above.

The narrowband WLAN can operate at a much lower duty cycle (lower frequency) than the beacon period of the wideband WLAN, so the time interval 412 of narrowband operation only has to occur every so often (every specified number of beacons, for example) to match the periodicity of the narrowband network operation. For example, a wideband beacon can be transmitted every 100 time units, and a narrowband operation interval 412 can occur every 1000 time units and last a duration of 5 time units.

As shown in FIG. 4, following the transmission of a wideband beacon 406 that includes a Quiet Element, the narrowband operation time interval 412 starts after a time offset 414 (referred to as Quiet Offset) from the time the Quiet Element was transmitted. The Quiet Offset value is a field in the Quiet Element. The narrowband operation time interval 412 can have a time duration 416 equal to a value of a Quiet Duration field in the Quiet Element.

At the beginning of the narrowband operation time interval 412, the AP 102 sends a narrowband downlink frame that is essentially a beacon frame (referred to as a narrowband beacon) which contains information for discovery of the narrowband network and operation of the narrowband network. The first transmission in a narrowband channel during the narrowband operation time interval 412 can be a transmission of the narrowband beacon including polling information or other triggers. This information may include information about the narrowband network operation such as duration and periodicity of the period at which the AP operates in the narrowband. The information in the narrowband beacon can also include information about the wideband network (i.e., part of the information that the same AP transmits in a wideband beacon). During a narrowband operation time interval 412, the AP 102 does not listen on the wideband channel. At the end of the narrowband operation time interval 412, the AP 102 resumes receiving on the wideband operating channel.

In addition to the transmission of the narrowband beacon, during a narrowband operation time interval 412, the AP 102 can transmit downlink data, transmit a trigger for uplink data (to cause a wireless device to send uplink data), receive uplink data, receive contention-based frames, receive a Probe Request, transmit a Probe Response, and transmit narrowband Target Wake Time (TWT) assignments. A TWT is a specific time or set of times for individual STAs to wake in order to exchange frames with other STAs.

Communications of data during a narrowband operation time interval 412 can include communications of contention-based traffic, communications of traffic during contention-free periods, communications of scheduled traffic, communications of triggered traffic, and so forth.

2. Coexistence of Narrowband Operation by Adding Information to the Quiet Element The solutions described in this section (Section 2) can be used to address Issue 2 discussed further above.

In the solutions of this section, instead of using a legacy Quiet Element as described in Section 1 above, an Extended Quiet Element can be used instead. The Extended Quiet Element includes the information of the legacy Quiet Element as well as additional information relating to narrowband operation (i.e., relating to communication using a narrowband channel).

The information relating to communication using the narrowband channel in the Extended Quiet Element can include one or more selected from among the following:
  an indication of an operation to be performed during a Quiet Period,
  a range of a narrowband network,
  a schedule relating to future Quiet Periods,
  a time duration within a Quiet Period to be used for narrowband communication,
  an indication of a maximum transmit power of the narrowband network,
  a set of supported communication rates of the narrowband network,
  an indication relating to a power save mode when communicating with the narrowband network, and
  a location of a narrowband channel within the wideband channel.

Although example types of information are listed above as being possibly part of an Extended Quiet Element, it is noted that other types of information can be included in an Extended Quiet Element in other examples.

The additional information in the Extended Quiet Element can be used to assist a wireless device that is capable of operating in both wideband and narrowband channels, but is currently operating only in the wideband channel, to learn more about the narrowband network that operates during a Quiet Period and to make a decision of whether or not to switch to narrowband operation.

With techniques or mechanisms as described in this section, the operation depicted in FIG. 3 can be modified such that the upcoming mode change indication transmitted (at 302) by the AP 102 to the wireless device can be included in the Extended Quiet Element. Moreover, the operation according to FIG. 3 is modified such that the wireless device decodes the Extended Quiet Element that includes the additional information relating to communication using a narrowband channel. During the quiet interval, the wireless device can decide to switch operating mode from wideband channel to the narrowband channel, based on the additional information in the Extended Quiet Element.

The Extended Quiet Element is broadcast (or unicast) by the narrowband-capable AP 102 in a wideband beacon (or Probe Response frame) on a wideband channel. The wireless device receives the Extended Quiet Element in a broadcast or unicast beacon frame or a Probe Response frame.

Figure 5:
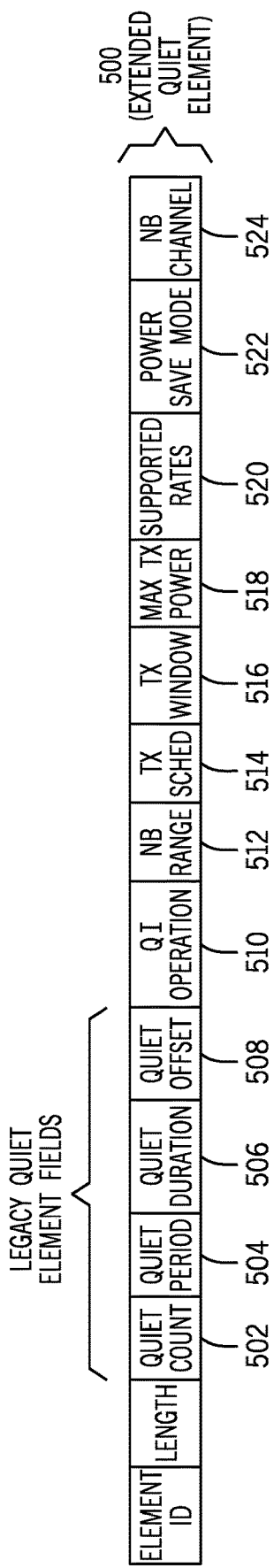
FIGS. 5 and 6 illustrate formats of example information elements according to various implementations.

As shown in FIG. 5, an Extended Quiet Element 500 contains the various fields 502 (Quiet Count), 504 (Quiet Period), 506 (Quiet Duration), and 508 (Quiet Offset) of the legacy Quiet Element, as defined by the IEEE 802.11 Specifications, in addition to any or some combination of the following information fields, as also depicted in FIG. 5.

Indication of an Operation to be Performed During a Quiet Interval

A Quiet Interval operation (QI Operation) indication 510 (in the form of a flag, a field, etc.) can be set to one of multiple different values to indicate respective different purposes of a quiet interval indicated by the Extended Quiet Element. For example, a first value of this indication can specify that the quiet interval is for LRLP operation, i.e., communication over narrowband channels. In other examples, the indication can have other values to indicate other types of operations during the quiet interval: DFS operation during the quiet interval, whitespaces detection during the quiet interval, or coexistence measurement during the quiet interval.

The wireless device can use this indication to determine what operations the wireless device may opportunistically perform during the quiet interval, such as operate in a narrowband channel, scan for neighbor APs in non-overlapping channels, and so forth.

Range of a Narrowband Network

A narrowband network range (NB range) indication 512 (in the form of a field, for example) provides information about the range of the narrowband network. One of the properties of narrowband LRLP is that a longer wireless propagation distance of a wireless transmitted signal from a wireless device is possible. A wireless device currently operating in wideband mode can use the range information to determine if the wireless device may have a better network connection, which can be beneficial if the wireless device is at or near the edge of the coverage area of a wideband WLAN. The wireless device can use the narrowband network range indication in a decision to switch communication modes (between wideband communication and narrowband communication).

In some examples, the range indication can be encoded as the range of the narrowband network relative to the wideband network based on the transmission power level and adjusted for channel width gain. The range indication can also be a single bit with a first value meaning range of narrowband is same as the wideband network, and a second value meaning the range of narrowband extends beyond the wideband network.

In further examples, the value of the range indication can be described in dB of transmit power. Alternatively, the value of the range indication can be described in a unit that takes into account dB of transmit power and an adjustment for channel width gain, e.g., dB per MHz of channel bandwidth.

A Schedule Relating to Future Quiet Periods

A transmission schedule (TX Sched) information 514 (in the form of a field, for example) can provide a schedule relating to future Quiet Periods. The transmission schedule information can provide wireless devices with period information with which the wireless devices can expect future Quiet Periods. Power save wireless devices (wireless devices that can transition to a lower power mode during inactive periods) do not listen to and decode every single beacon. The power save wireless devices can use this information to save power and still respect future Quiet Periods (i.e., coexist with the narrowband network by not coming out of power save and transmitting during a Quiet Period).

A Time Duration within a Quiet Interval to be Used for Narrowband Communication

A transmission window duration (TX Window) information 516 (in the form of a field, for example) provides a time duration within a quiet interval to be used by wireless devices for narrowband communication. The transmission window duration information provides a wireless device with the duration of a future window within which narrowband communication is possible. The AP 102 can set this duration to be the same as the quiet interval, but in some cases the AP may want only a subset of the quiet interval to be used for narrowband communication. The remaining time within the quiet interval can be used for other operations such as AP channel monitoring or DFS detection.

An Indication of a Maximum Transmit Power

A maximum transmit power (Max TX Power) indication 518 (in the form of a field, for example) provides the maximum transmit power of the AP 102 when operating the narrowband network. It can also contain the maximum power that STAs are allowed to operate in the narrowband channel during the quiet interval. The indication can be encoded as a 2 s compliment signed integer one octet in length in units of dBm, in some examples.

A Set of Supported Communication Rates of the Narrowband Network

The set of supported communication rates (Supported Rates) 520 (in the form of a field including multiple values, for example) refers to communication rates that are supported by a narrowband network during a quiet interval. In some examples, the set of supported communication rates can be encoded as a bitmap of rates, where each rate specifies a channel bandwidth, modulation and coding scheme. The set of supported communication rates may include a basic rate set that has to be supported by any wireless device attaching to the narrowband network, as well as additional optional communication rates.

An Indication Relating to a Power Save Mode

A power save mode (Power Save Mode) indication 522 (in the form of a field, for example) relating to a power save mode when communicating with a narrowband network can be used by wireless devices currently operating in the wideband network that may want to use the Target Wake Time (TWT) power save feature on the narrowband network. This indication provides an indication for wireless devices supporting implicit TWT or wireless devices supporting individual TWT agreements that the narrowband network operating during the quiet interval is capable of TWT operation. A TWT is a specific time or set of times for individual STAs to wake in order to exchange frames with other STAs.

A Location of a Narrowband Channel within a Wideband Channel

A narrowband channel (NB Channel) information 524 (in the form of a field, for example) provides information regarding a location (e.g., a center frequency, or an OFDMA allocation block) of a narrowband channel within a wideband channel. The narrowband channel is a subset of the wideband channel. The center frequency of the narrowband channel can be the same center frequency of the wideband channel. Alternatively, the center frequency of the narrowband channel can be at a different frequency within the frequency band of the wideband channel. The narrowband channel information describes where to find the narrowband channel either as an absolute value or relative to the wideband channel. The narrowband channel information may also indicate the channel width of the narrowband channel. WLAN Channel numbers in 2.4 GHz band are spaced every 5 MHz. For describing narrowband channels as channel numbers fractional numbers may be used.

The Extended Quiet Element may be transmitted by the AP 102 with each wideband beacon whenever the AP 102 decides that wireless devices associated with the AP 102 are to cease transmission on wideband channels. Alternatively, the AP 102 can detect whether legacy wireless devices and/or wireless devices capable of narrowband operation are present in the BSS of the AP 102. The determination by the AP 102 of whether or not a given wireless device associated with the AP 102 is a legacy wireless device or a wireless device that is capable of narrowband operation can be based on the capability information transmitted from the given wireless to the AP 102 during an association procedure to associate the given wireless device with the AP 102. The capability information can include a field set to a specific value to indicate that the given wireless device is capable of narrowband operation. If this field is set to a null value or a different value, or if the field does not exist, then that is an indication to the AP 102 that the given wireless device is a legacy wireless device capable of just wideband operation. For example, the AP 102 may transmit only the Extended Quiet Element if all wireless devices associated with the AP 102 are capable of performing narrowband operation. Alternatively, the AP 102 may transmit only the legacy Quiet Element if any legacy wireless device(s) is (are) associated with the AP 102. More generally, the AP 102 can switch between sending a legacy Quiet Element and an Extended Quiet Element depending upon whether or not any legacy wireless device(s) is (are) associated with the AP 102.

A dual-capable wireless device (such as the wireless device 116 of FIG. 1) can use the additional fields (fields in addition to those of the legacy Quiet Element) in the Extended Quiet Element to (1) discover the existence of a narrowband network, (2) decide whether or not to transition to the discovered narrowband network (e.g. based on the wireless device's capabilities matching the requirements of the wireless device), and (3) set the wireless device' operating parameters when the wireless device does transition to the narrowband network.

Some of the elements in the Extended Quiet Element may be duplicated in the narrowband beacon. This allows dual-capable wireless devices currently operating in wideband mode to only decode the wideband beacon, and dual-capable wireless devices and/or narrowband wireless devices currently operating in narrowband mode to only decode narrowband beacons.

3. Narrowband Network Information Element

The solutions of this section can be used to address Issue 2 discussed further above.

Figure 6:
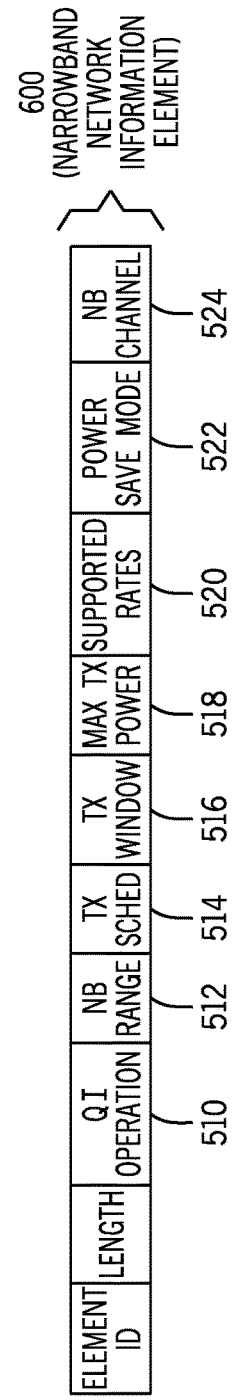

In alternative implementations, instead of using the Extended Quiet Element as described in Section 2, solutions according to this section (Section 3) employ a different information element, referred to as a "Narrowband Network Information Element." Solutions of Section 3 make use of both the legacy Quiet Element as well as the Narrowband Network Information Element. As shown in FIG. 6, a Narrowband Network Information Element 600 can include the additional information fields (one or more of fields 510, 512, 514, 516, 518, 520, 522, and 524) added to the Extended Quiet Element discussed above, except that the Narrowband Network Information Element 600 does not include the fields 502, 504, 506, and 508 of the legacy Quiet Element.

In yet further implementations, one or more of the additional information fields mentioned above can be included into an existing information element, such as a Very High Throughput (VHT) Capabilities information element, or a VHT Operations information element, or other information element.

In this mode of operation, the legacy Quiet Element is used in a wideband beacon to inform both narrowband-capable and legacy wireless devices of the Quiet Period during which narrowband operation will occur. The wideband beacon transmitted by the AP 102 can contain both the Narrowband Network Information Element 600 as well as the legacy Quiet Element. The legacy Quiet Element provides information to cause wireless devices to cease communicating over a wideband channel, to support basic coexistence of wideband and narrowband operations, while the Narrowband Network Information Element provides additional information to enhance the support for coexistence of wideband and narrowband operations.

Since the Extended Quiet Element of Section 2 will not be decoded by legacy wireless devices, for the purpose of supporting coexistence of legacy wireless devices operating in wideband mode and narrowband-capable wireless devices operating in narrowband mode, the information fields of the Extended Quiet Period are separated into the legacy Quiet Element and the Narrowband Network Information Element 600.

A dual-capable wireless device can use the legacy Quiet Element in the manner described in Section 1 for legacy coexistence and can use the Narrowband Network Information Element 600 to support narrowband operation. In some examples, the AP 102 can transmit a beacon containing two elements: (1) the legacy Quiet Element, and (2) the Narrowband Network Information Element 600 containing information about the narrowband network that the AP 102 (or another AP in an extended service set or ESS) will be operating during the quiet interval.

With solutions according to Section 3, the operation of FIG. 3 can be modified as follows. In transmission 302 of FIG. 3, the AP 102 transmits two indicators within a wideband beacon or a Probe Response frame. A first indicator (including the legacy Quiet Element) of the mode change period including the offset and duration, and a second indicator (including the Narrowband Network Information Element 600) containing information about the operation in the different mode.

The wireless device decodes the indicators in the wideband beacon or the Probe Response frame.

During the quiet interval, the wireless device may decide, based on information in the Narrowband Network Information Element 600, to switch operating mode to operate in the narrowband channel.

4. Polled Narrowband Network Information

Solutions as described in this section are modified from the solutions described in Section 3. With the solutions of Section 4, instead of sending the Narrowband Network Information Element 600 automatically to a wireless device, the AP 102 first waits for a query from the wireless device before sending the Narrowband Network Information Element 600 to the wireless device.

Figure 7:
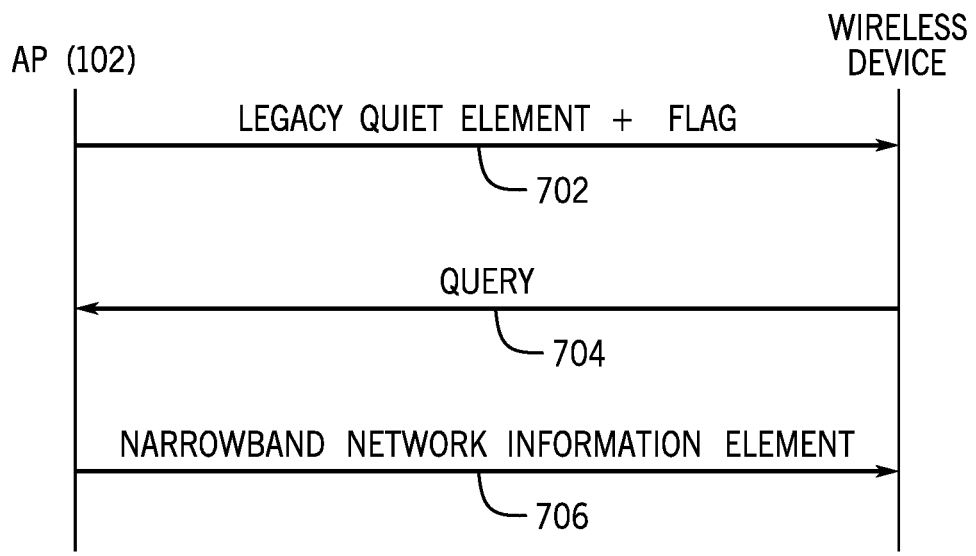
FIG. 7 is a message flow diagram of example interactions between a wireless device and an AP, according to alternative implementations.

As shown in FIG. 7, the AP 102 can transmit (at 702) a wideband beacon or Probe Response frame that contains a legacy Quiet Element and a flag, which can be a field in an Extended Capabilities Information Element or other information element. This flag can be a single-bit flag or some other type of indicator. If the flag is set to a first value, then that indicates that narrowband operation is not supported, but if set to a second value, that indicates the narrowband operation is supported. In response to the flag, the wireless device can decide whether or not to request additional information relating to communication using a narrowband channel. This decision can be based on the value of the flag. If the flag is set to the first value, then the wireless device does not request the additional information relating to communication using the narrowband channel. However, if the flag is set to the second value, then the wireless device can send (at 704) a query for the additional information relating to communication using the narrowband channel. In response to the query, the AP 102 sends (at 706) a response that contains the Narrowband Network Information Element 600.

5. AP Operation

The legacy Quiet Element, Extended Quiet Element, and Narrowband Network Information Element as described above can be used in different scenarios to enable backwards compatibility.

Figure 8:
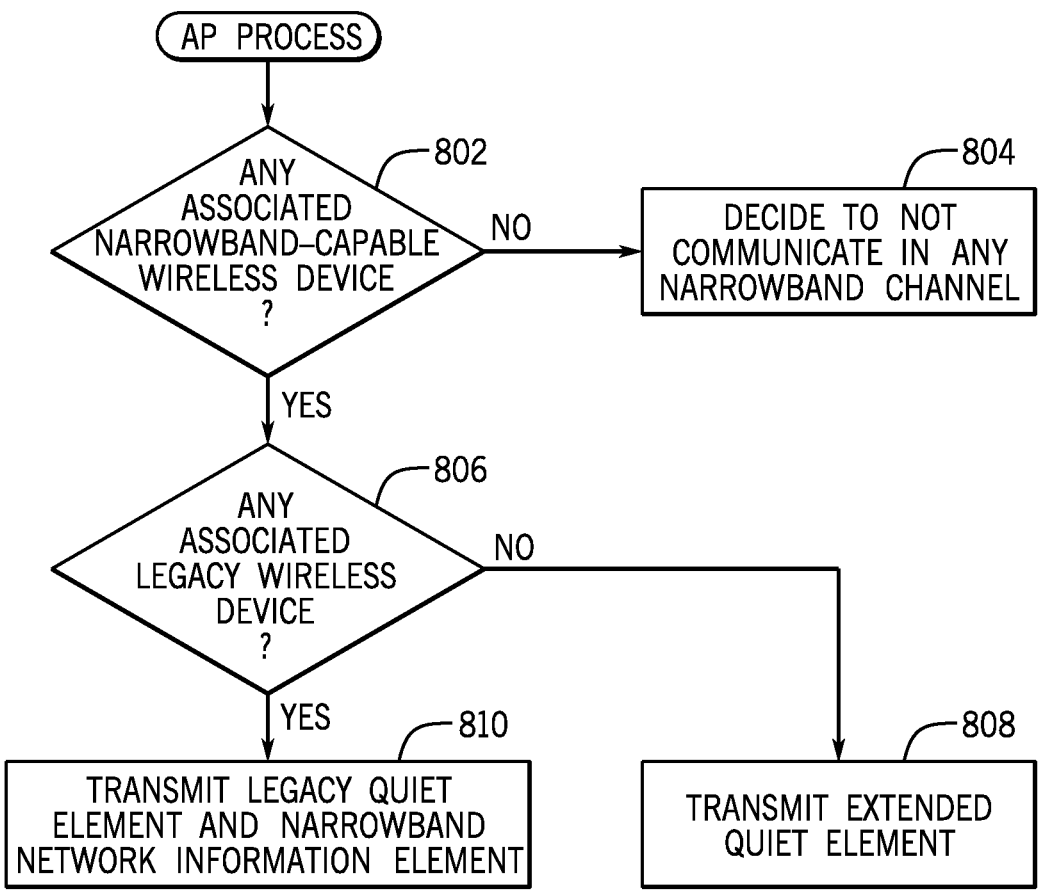
FIG. 8 is a flow diagram of an example process of an AP, according to some examples.

FIG. 8 shows a process of the AP 102 to decide which solution (according to Section 1, 2, or 3) to use depending on what type of wireless devices are currently associated with the AP 102. This results in the AP 102 selecting from among use of the legacy Quiet Element, Extended Quiet Element, and Narrowband Network Information Element to use for narrowband operation coexistence with wideband operation. Note that a legacy wireless device (such as the wireless device 108 in FIG. 1) is able to decode and use a legacy Quiet Element, but not an Extended Quiet Element or a Narrowband Network Information Element.

The process of FIG. 8 assumes that narrowband-capable wireless devices are capable of both wideband and narrowband operations, and the narrowband-capable wireless devices perform network discovery by first scanning and associating with the AP in the wideband channel. A wireless device that is only capable of narrowband operation may have difficulties in scanning and discovering an AP on the narrowband channel. The AP 102 may still send narrowband beacons when no wireless devices are currently connected in any wideband channel to enable narrowband-only wireless devices to discover the AP 102.

The AP 102 starts the process of FIG. 8 based on known capabilities of all wireless devices that are associated with the AP 102. The AP 102 determines (at 802) whether any narrowband-capable wireless devices are associated with the AP 102. If there is no narrowband-capable wireless device associated with the AP 102, then the AP 102 can decide (at 804) to not communicate in any narrowband channel, and thus the AP 102 does not send any information element, such as the Extended Quiet Element or Narrowband Network Quiet Element to protect narrowband communications.

If the AP 102 determines (at 802) that there is at least one narrowband-capable wireless device associated with the AP 102, then the AP 102 determines (at 806) whether there is any legacy wireless device associated with the AP 102. If the AP 102 determines (at 806) that there are no legacy wireless devices associated with the AP 102, then the AP 102 transmits (at 808) an Extended Quiet Element according to solutions described in Section 2.

If the AP 102 determines (at 806) that there is at least one legacy wireless device associated with the AP 102, then the AP 102 transmits (at 810) both a legacy Quiet Element and a Narrowband Network Information Element according to solutions described in Section 3.

Figure 9:
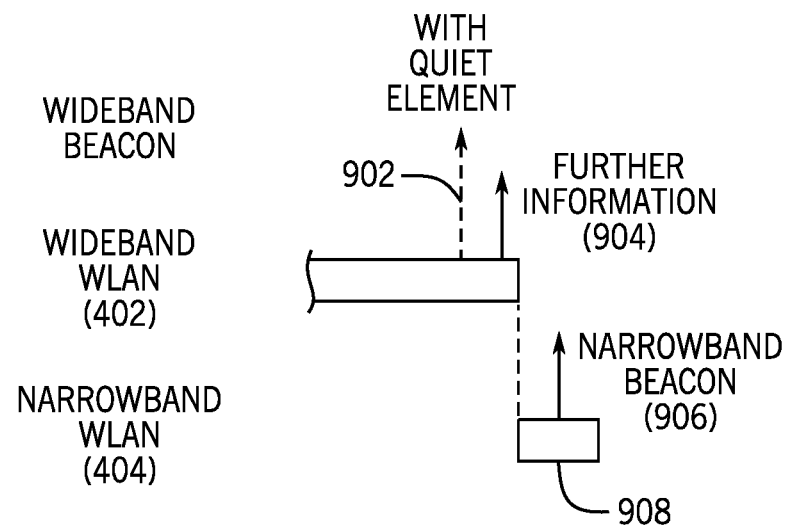
FIG. 9 illustrates example transmissions by an AP according to alternative implementations.

6. Setting an Indicator of a Time Period During which Wireless Transmission by a Wireless Device is not Initiated In some implementations, the AP 102 can send further information to a wireless device to set an indicator of a time period during which wireless transmission by the wireless device is not initiated, to protect communication in the narrowband channel from interference. As shown in FIG. 9, the further information can be sent in addition to a Quiet Element included in a wideband beacon 902. In alternative examples, the Quiet Element can included in a Probe Response frame. The Quiet Element included in the wideband beacon 902 can be a legacy Quiet Element or an Extended Quiet Element.

Following transmission of the wideband beacon 902, the further information 904 is transmitted by the AP 102. The further information 904 can be in the form of a legacy preamble (as discussed further above) or a clear to send (CTS)-to-self message. A CTS is a response message sent by an AP in response to a request to send (RTS) from a wireless device; the RTS and CTS are used as part of a procedure according to the IEEE 802.11 Specifications to reduce collisions.

The further information 904 is used to set an indicator of a time period during which wireless transmission by the wireless device is not initiated. The indicator can include a network allocation vector (NAV), which is an indicator maintained by each STA of time periods when transmission onto the wireless medium is not initiated by the STA regardless of whether the STA's clear channel assessment (CCA) function senses that the wireless medium is clear or busy.

The NAV is set in OBSS STAs for protection of narrowband communications, in addition to the various elements related to the quiet interval used for narrowband-wideband coexistence as described in Sections 1, 2, and 3.

The narrowband operation can be protected from OBSS STAs by the AP 102 sending the further information 904 immediately before the narrowband operation during the interval 908. FIG. 9 also shows the transmission of a narrowband beacon 906 in the narrowband WLAN 404. The narrowband beacon 906 can contain information about the duration of the narrowband operation time (i.e., the same duration as transmitted in the wideband Quiet Element), as well as other information as discussed further above.

7. System Architecture

Figure 10:
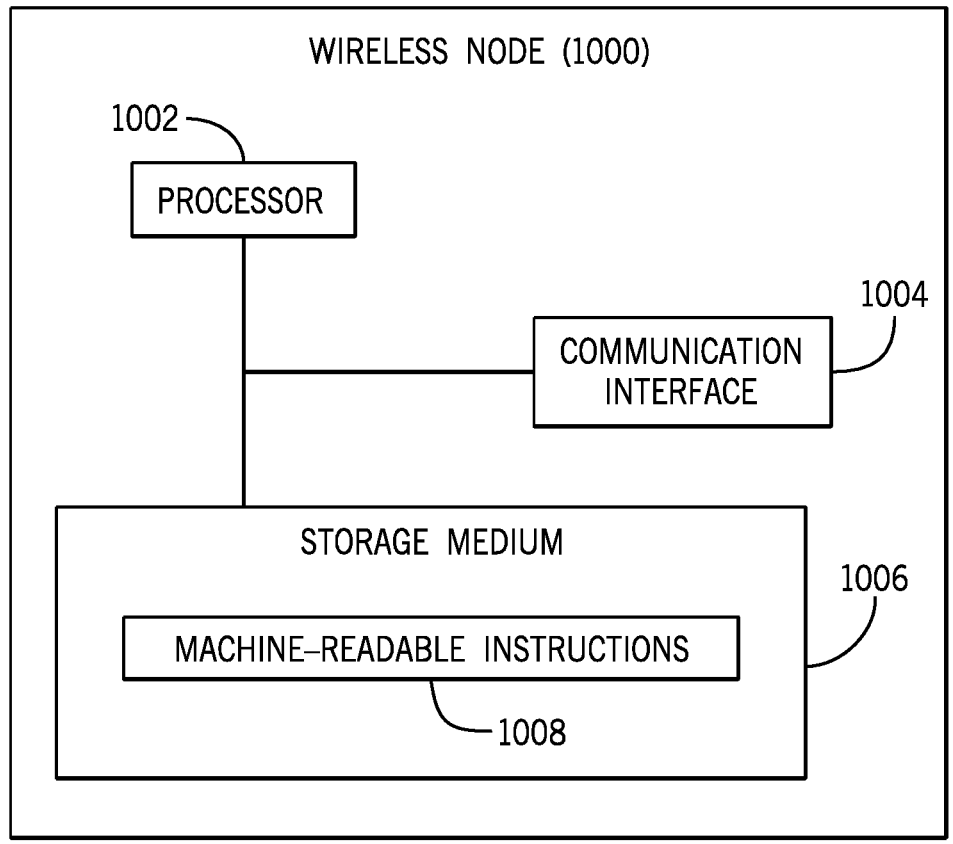
FIG. 10 is a block diagram of a wireless node according to some examples.

FIG. 10 is a block diagram of a wireless node 1000, which can be a wireless device (e.g., a non-AP STA) or an AP. The wireless node 1000 includes a processor (or multiple processors) 1002, which can be coupled to one or more communication interface(s) 1004 to communicate over a wireless link, and to a non-transitory machine-readable or computer-readable storage medium 1006 storing machine-readable instructions 1008 executable on the processor(s) 1002 to perform various tasks as described above.

A processor can include a microprocessor, a core of a multi-core microprocessor, a microcontroller, a programmable integrated circuit, a programmable gate array, or another hardware processing circuit.

The storage medium 1006 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a wireless device, comprising:
   transmitting a narrowband downlink frame in a narrowband channel, the narrowband downlink frame comprising a first beacon that is transmitted periodically, wherein the narrowband channel has a frequency range that is less than and within a frequency range of a wideband channel;
   transmitting, in the narrowband channel, information about a wideband network comprising the wideband channel; and
   prior to transmitting the narrowband downlink frame, transmitting further information containing a time period during which stations in range of the wireless device are not to initiate wideband transmissions, the time period being for narrowband communications comprising the transmitting of the first beacon and the information about the wideband network.

2. The method of claim 1, wherein the narrowband downlink frame comprises discovery information relating to discovery or operation of a narrowband network.

3. The method of claim 2, wherein the wireless device is a first wireless device, and wherein the discovery information is useable by a second wireless device to discover the first wireless device.

4. The method of claim 1, wherein a frequency of transmission of first beacons in the narrowband channel is less than a frequency of transmission of second beacons in a wideband channel such that the wireless device transmits the first beacons less frequently than the second beacons.

5. The method of claim 1, wherein the wireless device is an access point that operates according to Institute of Electrical and Electronic Engineers (IEEE) 802.11.

6. The method of claim 1, further comprising:
prior to transmitting the narrowband downlink frame, transmitting, by the wireless device, the further information useable to avoid overlapping transmissions by multiple wireless devices on a wireless medium.

7. The method of claim 6, wherein the further information comprises a legacy preamble.

8. The method of claim 7, wherein the legacy preamble contains the further information.

9. The method of claim 8, wherein the time period contained in the legacy preamble is to protect a communication in the narrowband channel from interference by communication in the wideband channel.

10. The method of claim 1, further comprising:
sending, by the wireless device, an indication relating to Target Wake Time (TWT) operation.

11. The method of claim 10, wherein the indication relating to the TWT operation is useable by another wireless device that a narrowband network is capable of the TWT operation during a time period.

12. A first wireless device comprising:
a communication interface to communicate wirelessly with a second wireless device; and
at least one processor configured to:
transmit a narrowband downlink frame in a narrowband channel, the narrowband downlink frame comprising a beacon frame that is transmitted periodically, wherein the narrowband channel has a frequency range that is less than and within a frequency range of a wideband channel;
transmit, in the narrowband channel, information about a wideband network comprising the wideband channel; and
prior to transmitting the narrowband downlink frame, transmit further information containing a time period during which stations in range of the first wireless device are not to initiate wideband transmissions, the time period being for narrowband communications comprising the transmitting of the beacon frame and the information about the wideband network.

13. The first wireless device of claim 12, wherein the narrowband downlink frame comprises discovery information relating to discovery or operation of a narrowband network.

14. The first wireless device of claim 12, wherein the first wireless device is an access point to operate according to Institute of Electrical and Electronic Engineers (IEEE) 802.11.

15. The first wireless device of claim 12, wherein a frequency of transmission of the beacon frame in the narrowband channel is less than a frequency of transmission of a wideband beacon in the wideband channel.

16. A non-transitory storage medium storing instructions that upon execution cause an access point (AP) to:
transmit a narrowband downlink frame in a narrowband channel, the narrowband downlink frame comprising a first beacon that is transmitted periodically, wherein the narrowband channel has a frequency range that is less than and within a frequency range of a wideband channel;
transmit, in the narrowband channel, information about a wideband network comprising the wideband channel; and
prior to transmitting the narrowband downlink frame, transmit further information containing a time period during which stations in range of the AP are not to initiate wideband transmissions, the time period being for narrowband communications comprising the transmitting of the first beacon and the information about the wideband network.

17. The non-transitory storage medium of claim 16, wherein a frequency of transmission of first beacons in the narrowband channel is less than a frequency of transmission of second beacons in a wideband channel such that the AP transmits the first beacons less frequently than the second beacons.

* * * * *